United States Patent [19]

Wilson et al.

[11] Patent Number: 5,208,804
[45] Date of Patent: May 4, 1993

[54] FLEXIBLE-BANDWIDTH RADIO

[75] Inventors: Timothy J. Wilson, Schaumburg; Stuart W. Thro, Cary, both of Ill.

[73] Assignee: Motorola, Inc., Schaumburg, Ill.

[21] Appl. No.: 605,893

[22] Filed: Oct. 30, 1990

[51] Int. Cl.$^5$ .............................. H04J 1/00; H04B 7/02
[52] U.S. Cl. .................................... 370/30; 370/69.1; 370/118; 375/8; 375/38
[58] Field of Search .................. 370/24, 30, 69.1, 120, 370/121, 70, 76, 84, 112, 118; 375/38, 39, 40, 8

[56] References Cited

U.S. PATENT DOCUMENTS

| | | | |
|---|---|---|---|
| 3,742,149 | 6/1973 | Yoshida et al. | 370/69.1 |
| 4,620,294 | 10/1986 | Leung et al. | 375/8 |
| 4,630,286 | 12/1986 | Betts | 375/39 |
| 4,768,187 | 8/1988 | Marshall | 370/69.1 |
| 4,783,779 | 11/1988 | Takahata et al. | 370/69.1 |
| 4,837,766 | 6/1989 | Yoshida | 375/39 |
| 4,881,241 | 11/1989 | Pommier et al. | 375/38 |
| 5,119,402 | 6/1992 | Ginzburg et al. | 375/38 |

Primary Examiner—Douglas W. Olms
Assistant Examiner—Alpus H. Hsu
Attorney, Agent, or Firm—Wayne J. Egan

[57] ABSTRACT

A flexible-bandwith radio is provided. Briefly, the radio is equipped with a multiplicity of modulator and demodulator units arranged to communicate on a multiplicity of discrete frequency bands. There is no need for the individual frequency bands to be contiguous. As a result, the radio is able to simultaneously supporting a multiplicity of band-limited radio channels. The radio is further equipped with a channel combiner unit and a channel divider unit to combine the individual channels to form a high-capacity aggregate channel. The aggregate channel is then provided to the user, or to a user application. In a first embodiment, the radio utilizes a multiplicity of discrete modulator, demodulator, combiner, and divider units. In a second embodiment, the radio utilizes a suitably-programmed digital signal processor to perform the equivalent modulator, demodulator, combiner, and divider functions.

18 Claims, 2 Drawing Sheets

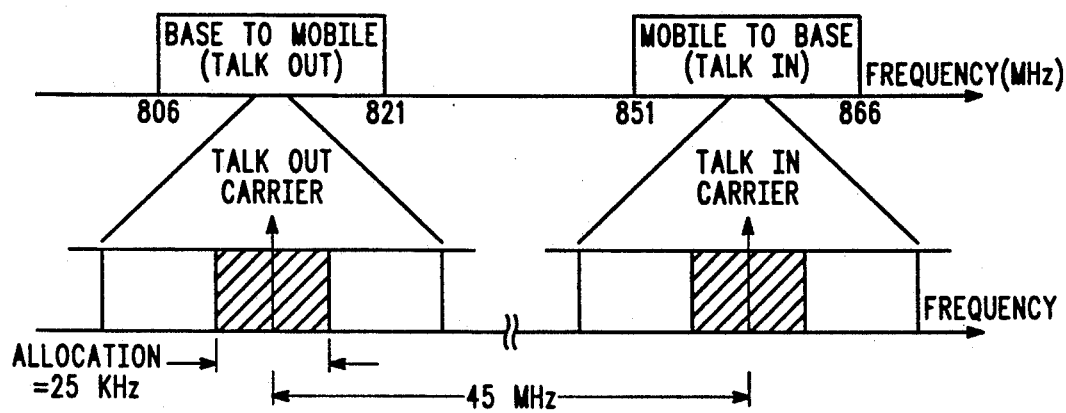
FIG.1 — PRIOR ART —
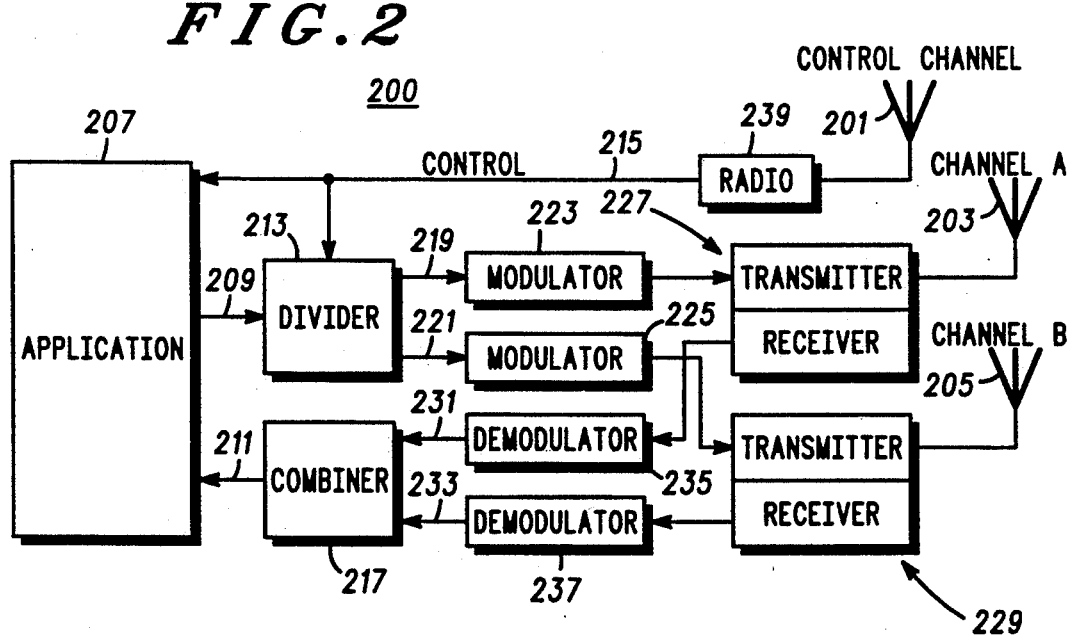
FIG.2

FLEXIBLE-BANDWIDTH RADIO

TECHNICAL FIELD

This application relates to a method and apparatus for a radio making simultaneous use of more than one radio channel.

BACKGROUND OF THE INVENTION

In existing land mobile radio systems, the available bandwidth is divided by frequency into discrete channels. This technique is referred to as Frequency Division Multiplexing (FDM). The purpose of this channelization is to allow many users to simultaneously use available spectrum without interference. As an example, FIG. 1 illustrates the situation in the 800 land mobile band.

In the 800 MHz band, each radio channel actually comprises two allocations: a 25 KHz-wide allocation between 806–821 MHz for Base-to-Mobile transmission, and a 25 KHz-wide allocation between 851–866 MHz for Mobile-to-Base transmission. The spacing between the two 25 KHz allocations is always 45 MHz, this spacing known in the art as "T/R spacing". All users must control their modulation in conformance with FCC regulations such that their emissions remain within their assigned 25 KHz allocated bandwidth. It will be apparent that other land mobile bands may differ in allocated bandwidth values and T/R spacing, but are otherwise similar.

In certain bands such as, for example, the 800 MHz band, groups of channels may be organized into the common trunked radio system arrangement. The number of channels in such a system is typically from 5 to 20 channels; these channels are usually non-contiguous. In a typical trunking system such as, for example, the Motorola "Privacy Plus" system, one of the groups of channels is dedicated to control, and a central controller arbitrates the use of the remaining channels. Mobile users communicate with the central controller via the control channel to request and thereby receive allocation for one of the system's radio channels for their temporary use.

This FDM approach outlined above has proved satisfactory for voice communications, since voice signals typically occupy a predictable or constant bandwidth. On the other hand, often this approach is very unsatisfactory for data communication applications. One reason for this is that data communications typically are "bursty" and non-uniform in their bandwidth requirements. For instance, a data application may require very little bandwidth at some points in the session, but very great bandwidth at other points in the session. In the FDM approach, the maximum available data throughput is restricted by the fixed channel allocation bandwidth-and this is often too low to allow satisfactory operation of data applications.

If we now consider a trunked radio system, the bandwidth limit imposed by FDM appears even more unsatisfactory. This is because once a user has obtained a channel allocation from the central controller, he is limited by the data throughput of that assigned channel. One irony of this unfortunate situation is that other channels in the trunked system might be unused and therefore available at the very time a user's throughput becomes blocked since he is limited to only one channel.

SUMMARY OF THE INVENTION

It is an object of the invention, therefore, to provide a flexible-bandwidth radio that can make simultaneous use of more than one radio channel. Accordingly, a flexible-bandwidth radio is provided. Briefly, the radio is equipped with a multiplicity of modulator and demodulator units arranged to communicate on a multiplicity of discrete frequencies or channels. There is no need for the individual frequencies or channels to be contiguous or adjacent, and thus some or even all may be non-contiguous and non-adjacent. As a result, the radio simultaneously transmits and/or receives a multiplicity of signals over a like number of individual radio channels. The radio is further equipped with a signal combiner unit and a signal divider unit to combine the individual signals transmitted and/or received from the individual radio channels to form a high-capacity aggregate signal. The aggregate signal is then provided to the end user, or to a user application. In a first embodiment, the radio utilizes a multiplicity of discrete modulator, demodulator, combiner, and divider units. In a second embodiment, the radio utilizes a suitably-programmed digital signal processor to perform the equivalent modulator, demodulator, combiner, and divider functions.

BRIEF DESCRIPTION OF THE DRAWINGS

FIG. 1 is a frequency diagram that shows the 800 MHz land mobile band, as in the prior art.

FIG. 2 is a block diagram that shows a first embodiment of a flexible-bandwidth radio, according to the invention.

DETAILED DESCRIPTION OF THE INVENTION

Figure 3:
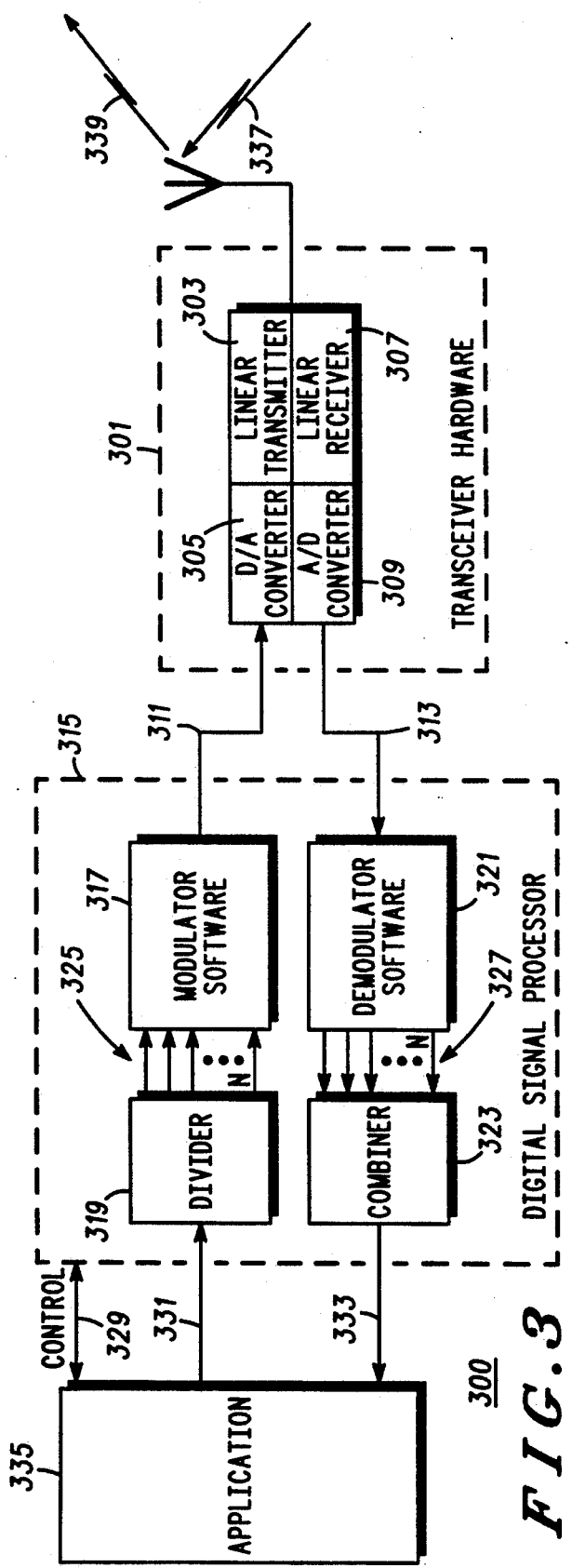
FIG. 3 is a block diagram that shows a second embodiment of a flexible-bandwidth radio, according to the invention.

Referring now to FIG. 2, there is shown a first embodiment of the invention. There is shown a radio 200 arranged to transmit and receive on a control channel 201, and on a first user channel 203, and on a second user channel 205. As shown, the channels 201, 203, and 205 are ultimately coupled to a data application 207.

To discuss the radio 200, let us assume the data application 207 is at a quiescent state, and therefore is not presently communicating on channel 203 or 205. From this point, the following hypothetical scenario of a typical data session will be illustrative:

Assume now that application 207 desires to transmit data at a rate that may be satisfactorily carried by a single channel, say channel 203. Accordingly, application 207 communicates with a remote system controller (not shown) via control path 215, transceiver 239, and control channel 201 in order to request that channel 203 be assigned for its use.

Assuming that channel 203 is available, the remote controller will now inform application 207 of the assignment by channel 201, transceiver 239, and control path 215. Data application 207 now proceeds to send data to a remote fixed end (not shown) via data path 209, data divider 213, path 219, modulator 223, transceiver 227, and channel 203. In this first state (radio 200 using a single user channel 203), the data divider 213 receives the data from path 209 and couples it to path 219.

The receive function is analogous to the above. The remote fixed end sends data to application 207 via channel 203, transceiver 227, demodulator 235, path 231, data combiner 217, and path 211. In this first state, the data combiner 217 receives the data from path 231 and couples it to path 211.

In this first state, if it is assumed the data rate of path 209 is a value C, then the data rate of path 219 will also be C. Likewise, if the data rate of path 231 is C, then the data rate of path 211 will also be C.

Now assume that application 207, whilst in the process of utilizing a single channel 203, desires to transmit data at an increased rate that may be satisfactorily carried only by the combined capacity of two channels, namely channels 203 and 205. Accordingly, application 207 communicates with a remote system controller (not shown) via control path 215, transceiver 239, and control channel 201 in order to request that channel 205 additionally be assigned for its use.

Assuming that channel 205 is available, the remote controller will now inform application 207 of the assignment by channel 201, transceiver 239, and control path 215. Data application 207 now proceeds to send data to a remote fixed end (not shown) via data path 209, data divider 213, paths 219 and 221, modulators 223 and 225, transceivers 227 and 229, and channels 203 and 205. In this second state (radio 200 using channels 203 and 205), the data divider 213 receives the data from path 209, divides the data into two portions, couples a first portion to path 219, and a second portion to path 221.

The receive function is analogous to the above. The remote fixed end sends data to application 207 via channels 203 and 205, transceivers 227 and 229, demodulators 235 and 237, paths 231 and 233, data combiner 217, and path 211. In this second state, the data combiner 217 receives a first portion of data from path 231, receives a second portion of data from path 233, and couples both portions to path 211.

In this second state, if it is assumed the data rate of path 209 is a value 2C, then the data rate of paths 219 and 221 will each be C. Likewise, if the data rate of paths 231 and 233 is each C, then the data rate of path 211 will be 2C.

It will be apparent that, as depicted in FIG. 2, the data divider 213 may comprise, for example, an ordinary demultiplexer arranged to provide input (path 209)/output (paths 219 and 221) bit rates of 1:1 in the first state, and 2:1 in the second state. Likewise, the data combiner 217 may comprise, for example, an ordinary multiplexer arranged to provide input (paths 231 and 233)/output (path 211) bit rates of 1:1 in the first state, and 1:2 in the second state.

Those skilled in the art will appreciate that although FIG. 2 depicts the radio 200 arranged to access two user channels 203 and 205, it would be possible to extend the architecture of radio 200 to access a third user channel. Moreover, the architecture may be expanded to accommodate a multiplicity of additional user channels. This would be accomplished by furnishing additional modulator, demodulator, and transceiver units, and by rearranging the divider and combiner units to process the additional channels.

Referring now to FIG. 3, there is shown a second embodiment of the invention. In this embodiment, the multiple radios 239, 227, and 229 of the first embodiment are replaced by a single transceiver 301 comprising a linear transmitter (TX) 303, linear receiver (RX) 307, analog-to-digital converter (A/D) 309, and digital-to-analog converter (D/A) 305. This hardware may be arranged to transmit and receive on any set of channels comprising the entire band of interest such as, for example, the 806–821 MHz (base to mobile) band 337 and the 851–866 MHz (mobile to base) band 339 in the 800 band. Thus, A/D 309 and RX 307 act to convert the 806–821 MHz (base to mobile) band 337 to a linear digital bit stream 313 for processing by the digital signal processor (DSP) 315. Likewise, D/A 305 and TX 303 receives a linear digital bit stream 311 from the DSP 315 and converts it to the 851–866 MHz (mobile to base) band 339.

It is assumed the 806–821 MHz (base to mobile) band 337 and the 851–866 MHz (mobile to base) band 339 each contain N+1 channels. It is assumed the capacity of each channel is a fixed value, C.

Within the DSP 315, software algorithm 317 is arranged to modulate an arbitrary number of specific channels 325 within the band 339. Likewise, software algorithm 321 is arranged to demodulate an arbitrary number of specific channels within the band 337. As before, one channel is designated as a control channel 329, which is used to communicate between the data application 335 and the remote controller (not shown). Since there are N+1 available channels, this leaves a maximum on N channels available for the data application 335.

In the transmit (mobile to base) direction, the data application 335 therefore forms an aggregate data signal 331 of maximum capacity NC and provides this signal to data divider algorithm 319. The data divider algorithm 319 then divides (or demultiplexes) the aggregate signal 331 into a maximum of N individual channels, collectively represented as element 325, each of capacity C. The modulator algorithm 317 then modulates the individual channels 325 into a composite signal 311. The composite signal 311 is then processed by D/A 305 and TX 303 to form the 851–866 MHz (mobile to base) transmitted signal 339.

In the receive direction, the RX 307 and the A/D 309 process the incoming 806–821 MHz (base to mobile) signal 337 to form a composite signal 313. The demodulator algorithm 321 then demodulates this signal to form a maximum of N individual channels, represented collectively as element 327. The individual channels 327 are then combined by data combiner algorithm 323 to form the aggregate signal 333 of maximum capacity NC. This signal 333 is finally coupled to the data application 335.

With this arrangement, the data application 335 dynamically requests an appropriate number of channels from the remote controller. The number of channels (and hence the bandwidth) allocated to the radio 300 thus dynamically varies in accordance with the instantaneous throughput requirements of the application 335.

Figure 4:
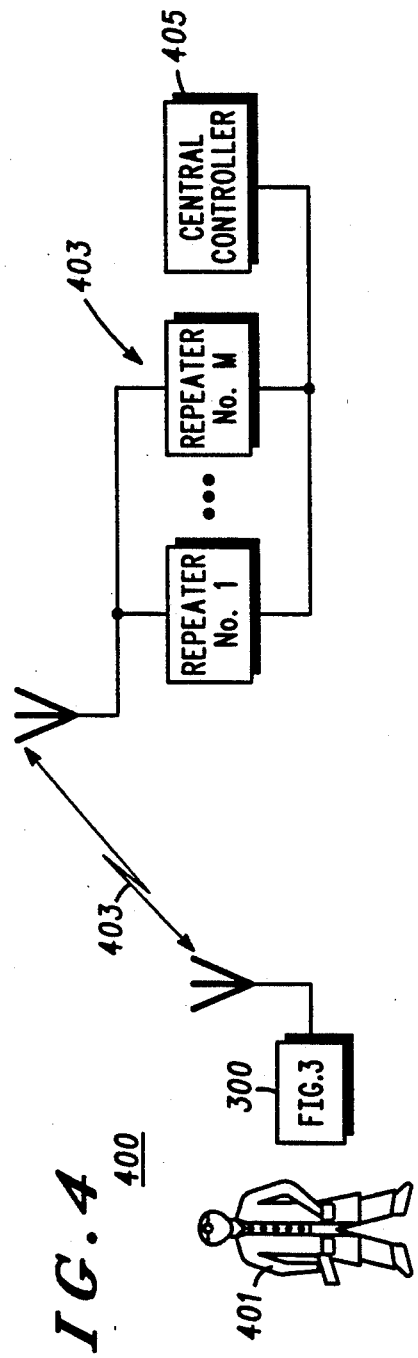
FIG. 4 is a block diagram that shows a typical application of the flexible-bandwidth radio, according to the invention.

FIG. 4 illustrates a typical application. There is shown a trunked radio system comprising a subscriber unit 300 (as per FIG. 3, above), together with fixed equipment 403. The fixed equipment 403 includes a plurality M of channels, here designated repeaters 1–M, together with central controller 405. Assuming the 800 band, then M may vary from 5 to 20, or more. The user 401 is operating a data application which is providing communication to a remote user or host (not shown). Typically, for most of the session, very little data throughput is required such as, for example, while the user is thinking. At these times the data application would find perhaps one (or even zero) radio channel to be adequate to meet the needs of the user 401. In such a situation, then, link 403 would utilize only the equivalent capacity of the single radio channel.

But at certain other times during the session, for instance, a user action may result in a requirement for a high data throughput. This might occur, for instance, during a file transfer or during a rewrite of the screen display. In order to satisfy this increased throughput need, the data application would attempt to obtain more channels, say N, up to the maximum available in the trunked system. In such a situation, then, link 403 would utilize the equivalent capacity of N radio channels.

Those skilled in the art will appreciate that various elements of FIGS. 2-4 have been variously described as "data channels", "data application", "data divider", and "data combiner", and so forth. Notwithstanding that such elements have been designated with the prefix "data", it will be appreciated that the user's application itself might not be strictly "data" oriented. Indeed, the user's end application may have little, or nothing, to do with data, per se. Moreover, the user's end application might be voice, facsimile, telex, FAX, video, audio, alarm, measurement, text, graphics, data, or another type, or any combination of these. As a hypothetical example, the user's end application might comprise transmitting and/or processing purely analog signals such as, for example, a high-quality, high-fidelity performance by a symphony orchestra. Therefore, the designation of any component or channel in the present application with the prefix "data" should not be considered to limit the information or type of information ultimately conveyed by such component or channel, nor should it be considered to limit the user's application.

It should be apparent that when a multiplicity of users share the resources of a trunked system, operating in accordance with the principles of the invention will result in a much more efficient use of the system radio channels as well as improved performance from the user's point of view.

In the foregoing discussion it has been assumed that each FDM channel allocation (25 KHz in the 800 band) contains only one bearer channel. This is commonly true today. However, it should be apparent the principles of the invention may be easily extended to the case where the FDM channels, each of capacity C, are split into a multiplicity, say N, of logical subchannels such as, for instance, by the use of time division multiplexing. In this case, each subchannel may be treated as an individual channel of capacity C/N; any number of these subchannels may then be combined using the principles of the invention to yield the required throughput.

It will be appreciated that one advantage of the present invention over existing multi-carrier modulation schemes is that the channels utilized need not be contiguous in the spectrum.

One method of utilizing a flexible-bandwidth radio, according to the invention, would be for the application to determine a maximum desired bandwidth (say 500 Kbs) and a minimum needed bandwidth (say 64 Kbs). The application would then convey these two limits to the central controller. The controller would start by allocating 64 Kbs and allocating this to the application. The application would then begin using this bandwidth. The controller, however, would continue to search for additional idle bandwidth and, when some becomes available, it would allocate it for the application. In response, the application would use the additional bandwidth upon allocation from the controller. The advantage here is, of course, that system bandwidth resources are constantly utilized as efficiently as possible, while the user's application is executed with the minimum possible delay.

While various embodiments of a flexible-bandwidth radio, according to the present invention, have been described hereinabove, the scope of the invention is defined by the following claims.

What is claimed is:

1. In a radio arranged to transmit in a radio frequency band, the radio frequency band including a set of n predetermined radio frequency channels, each of the n predetermined radio frequency channels being capable of supporting a predetermined data rate, a method for the radio to transmit an aggregate signal via the n predetermined radio frequency channels, the aggregate signal having an aggregate data rate which exceeds the predetermined data rate of any individual radio frequency channel of the set of n predetermined radio frequency channels, the method comprising the steps of:
    (a) forming a multiplicity of n signals, each of the multiplicity of n signals being based on said aggregate signal;
    (b) modulating each of the n signals to form n modulated signals; and,
    (c) transmitting said n modulated signals via said n predetermined radio frequency channels, each of said n modulated signals being transmitted on exactly one radio frequency channel,
    wherein said forming step (a) and said modulating step (b) are performed substantially by a digital signal processor.

2. The method of claim 1, at least some of said n predetermined radio frequency channels being non-contiguous and non-adjacent.

3. The method of claim 2, each of the multiplicity of n signals having a data rate of 1/n the aggregate data rate.

4. In a radio arranged to receive in a radio frequency band, the radio frequency band including a set of n predetermined radio frequency channels, each of the n predetermined radio frequency channels being capable of supporting a predetermined data rate, a method for the radio to receive a set of n modulated signals via the n predetermined radio frequency channels and to form an aggregate signal, the aggregate signal having an aggregate data rate which exceeds the predetermined data rate of any individual radio frequency channel of the set of n predetermined radio frequency channels, the method comprising the steps of:
    (a) receiving said n modulated signals via said n predetermined radio frequency channels, each of the n modulated signals being received on exactly one radio frequency channel;
    (b) demodulating each of the n modulated signals to form n demodulated signals; and,
    (c) forming an aggregate signal based on said n demodulated signals,
    wherein said demodulating step (b) and said forming step (c) are performed substantially by a digital signal processor.

5. The method of claim 4, at least some of said n predetermined radio frequency channels being non-contiguous and non-adjacent.

6. The method of claim 5, each of the n demodulated signals having a data rate of 1/n the aggregate data rate.

7. A radio arranged to transmit in a radio frequency band, the radio frequency band including a set of n predetermined radio frequency channels, each of the n predetermined radio frequency channels being capable of supporting a predetermined data rate, the radio arranged for transmitting an aggregate signal via the n predetermined radio frequency channels, the aggregate signal having an aggregate data rate which exceeds the predetermined data rate of any individual radio frequency channel of the set of n predetermined radio frequency channels, the radio comprising:
   forming means for forming a multiplicity of n signals, each of the multiplicity of n signals being based on said aggregate signal;
   modulating means for modulating each of the n signals to form n modulated signals; and,
   transmitting means for transmitting said n modulated signals via said predetermined radio frequency channels, each of said n modulated signals being transmitted on exactly one channel
   wherein said forming means and said modulating means are substantially comprised by a digital signal processor.

8. The radio of claim 7, at least some of said n predetermined radio frequency channels being non-contiguous and non-adjacent.

9. The radio of claim 8, each of the multiplicity of n signals having a data rate of 1/n the aggregate data rate.

10. The radio of claim 9, said radio being a trunked-type radio.

11. A radio arranged to receive in a radio frequency band, the radio frequency band including a set of n predetermined radio frequency channels, each of the n predetermined radio frequency channels being capable of supporting a predetermined data rate, the radio being arranged for receiving a set of n modulated signals via the n predetermined radio frequency channels and forming an aggregate signal, the aggregate signal having an aggregate data rate which exceeds the predetermined data rate of any individual radio frequency channel of the set of n predetermined radio frequency channels, the radio comprising:
   receiving means for receiving said n modulated signals via said predetermined radio frequency channels, each of the n modulated signals being received on exactly one radio frequency channel;
   demodulating means for demodulating each of the n modulated signals to form n demodulated signals; and,
   forming means for forming an aggregate signal based on said n demodulated signals,
   wherein said demodulating means and said forming means are substantially comprised by a digital signal processor.

12. The radio of claim 11, at least some of said n predetermined radio frequency channels being non-contiguous and non-adjacent.

13. The radio of claim 12, each of the n demodulated signals having a data rate of 1/n the aggregate data rate.

14. The radio of claim 13, said radio being a trunked-type radio.

15. A radio arranged to transmit in a radio frequency band, the radio frequency band including a set of n predetermined channels, each of the n predetermined radio frequency channels being capable of supporting a predetermined data rate, the radio arranged for transmitting an aggregate signal having an aggregate data rate which exceeds the predetermined data rate of any individual radio frequency channel of the set of n predetermined radio frequency channels, the radio comprising:
   a digital signal processor including;
      software means for forming a multiplicity of n signals, each of the multiplicity of n signals being based on said aggregate signal, and
      software means for modulating each of the n signals to form n modulated signals; and,
   transmitting means for transmitting said n modulated signals via said n predetermined radio frequency channels, each of said n modulated signals being transmitted on exactly one radio frequency channel.

16. A radio arranged to receive in a radio frequency band, the radio frequency band including a set of n predetermined radio frequency channels, each of the n predetermined radio frequency channels being capable of supporting a predetermined data rate, the radio being arranged for receiving a set of n modulated signals via the n predetermined radio frequency channels and for forming an aggregate signal, the aggregate signal having an aggregate data rate which exceeds the predetermined data rate of any individual radio frequency channel of the set of n predetermined radio frequency channels, the radio comprising:
   a digital signal processor including;
      software means for receiving said n modulated signals via said n predetermined radio frequency channels, each of the n modulated signals being received on exactly one radio frequency channel, and
      software means for demodulating each of the n modulated signals to form n demodulated signals; and,
   forming means for forming an aggregate signal based on said n demodulated signals.

17. A radio arranged to transmit in a radio frequency band, the radio frequency band including a set of n predetermined channels, each of the n predetermined radio frequency channels being capable of supporting a predetermined data rate, the radio arranged for transmitting an aggregate signal having an aggregate data rate which exceeds the predetermined data rate of any individual radio frequency channel of the set of n predetermined radio frequency channels, the radio comprising:
   a digital signal processor programmed for forming a multiplicity of n signals, each of the multiplicity of n signals being based on said aggregate signal, and for modulating each of the n signals to form n modulated signals; and,
   transmitting means for transmitting said n modulated signals via said n predetermined radio frequency channels, each of said n modulated signals being transmitted on exactly one radio frequency channel.

18. A radio arranged to receive in a radio frequency band, the radio frequency band including a set of n predetermined radio frequency channels, each of the n predetermined radio frequency channels being capable of supporting a predetermined data rate, the radio being arranged for receiving a set of n modulated signals via the n predetermined radio frequency channels and for forming an aggregate signal, the aggregate signal having an aggregate data rate which exceeds the predetermined data rate of any individual radio frequency channel of the set of n predetermined radio frequency channels, the radio comprising:
  a digital signal processor programmed for receiving said n modulated signals via said n predetermined radio frequency channels, each of the n modulated signals being received on exactly one radio frequency channel, and for demodulating each of the n modulated signals to form n demodulated signals; and,
  forming means for forming an aggregate signal based on said n demodulated signals.

* * * * *